(12) United States Patent
Lewalle

(10) Patent No.: US 8,706,304 B2
(45) Date of Patent: *Apr. 22, 2014

(54) METHOD FOR OPTIMISING THE TRANSITION FROM ONE GRADE TO ANOTHER

(75) Inventor: André Lewalle, Brusseles (BE)

(73) Assignee: Total Research & Technology Feluy, Seneffe (Feluy) (BE)

( * ) Notice: Subject to any disclaimer, the term of this patent is extended or adjusted under 35 U.S.C. 154(b) by 281 days.

This patent is subject to a terminal disclaimer.

(21) Appl. No.: 12/741,382

(22) PCT Filed: Nov. 4, 2008

(86) PCT No.: PCT/EP2008/064941
§ 371 (c)(1),
(2), (4) Date: Aug. 23, 2010

(87) PCT Pub. No.: WO2009/059970
PCT Pub. Date: May 14, 2009

(65) Prior Publication Data
US 2010/0324738 A1    Dec. 23, 2010

(30) Foreign Application Priority Data
Nov. 5, 2007 (EP) .................................. 07120023

(51) Int. Cl.
*G05B 21/00* (2006.01)
(52) U.S. Cl.
USPC .......................................... 700/269
(58) Field of Classification Search
USPC .......................................... 700/269
See application file for complete search history.

(56) References Cited

U.S. PATENT DOCUMENTS

| | | | |
|---|---|---|---|
| 2,285,721 A | | 6/1942 | Karp |
| 3,152,872 A | | 10/1964 | Scoggin et al. |
| 4,448,736 A | * | 5/1984 | Emery et al. ............... 264/40.1 |
| 5,519,605 A | * | 5/1996 | Cawlfield .................... 700/31 |
| 6,106,785 A | * | 8/2000 | Havlena et al. ............ 422/109 |
| 6,213,958 B1 | * | 4/2001 | Winder ....................... 600/586 |
| 6,263,355 B1 | * | 7/2001 | Harrell et al. ............. 708/320 |
| 6,396,716 B1 | * | 5/2002 | Liu et al. ..................... 363/17 |
| 6,403,748 B1 | * | 6/2002 | Powers et al. ............ 526/348.2 |
| 6,718,234 B1 | * | 4/2004 | Demoro et al. ............ 700/269 |
| 6,723,805 B2 | * | 4/2004 | Braganca et al. .......... 526/61 |
| 7,116,414 B2 | * | 10/2006 | Long et al. ................. 356/301 |

(Continued)

FOREIGN PATENT DOCUMENTS

| | | | | |
|---|---|---|---|---|
| EP | 1195388 A1 | * | 4/2002 | ........... C08F 10/02 |
| EP | 1840140 A1 | * | 10/2007 | ........... C08F 10/00 |

(Continued)

OTHER PUBLICATIONS

Smith Haykin, "Neural Networks—A Comprehensive Foundation," 2nd Ed., Pearson Printice Hall, 1999.*

(Continued)

*Primary Examiner* — Kakali Chaki
*Assistant Examiner* — Fuming Wu

(57) ABSTRACT

The present invention relates to the polymerization of olefin monomers in a slurry loop reactor and to a model for determining and optimizing the changes in operating conditions that need to be applied when changing from one polymer grade to another.

19 Claims, 1 Drawing Sheet

(56) References Cited

U.S. PATENT DOCUMENTS

| | | | |
|---|---|---|---|
| 7,133,784 B2* | 11/2006 | Vaidyanathan et al. | 702/30 |
| 7,319,040 B2* | 1/2008 | Vaidyanathan et al. | 436/173 |
| 7,418,372 B2* | 8/2008 | Nishira et al. | 703/2 |
| 7,774,178 B2* | 8/2010 | Pannell et al. | 703/2 |
| 2003/0120361 A1* | 6/2003 | Anderson et al. | 700/31 |
| 2005/0085598 A1 | 4/2005 | Sandell et al. | |
| 2005/0272891 A1* | 12/2005 | Fouarge et al. | 526/943 |
| 2008/0065360 A1* | 3/2008 | Pannell et al. | 703/2 |
| 2010/0016523 A1* | 1/2010 | Moers et al. | 526/64 |

FOREIGN PATENT DOCUMENTS

| | | | | |
|---|---|---|---|---|
| JP | 2003519255 A | | 6/2003 | |
| WO | 97/26549 | | 7/1997 | |
| WO | WO 97/26549 | * | 7/1997 | G01R 33/46 |
| WO | WO 97/26549 A1 | * | 7/1997 | G01R 33/46 |
| WO | 00/22489 | | 10/1999 | |
| WO | WO 00/22489 | * | 4/2000 | G05B 17/02 |
| WO | WO 00/22489 A1 | * | 4/2000 | G05B 17/02 |
| WO | WO 0022489 A1 | * | 4/2000 | G05B 17/02 |
| WO | 01/49751 | | 7/2001 | |
| WO | 01/049751 A1 | | 7/2001 | |
| WO | WO 01/49751 | * | 7/2001 | C08F 10/02 |
| WO | WO 01/49751 A1 | * | 7/2001 | C08F 10/02 |
| WO | WO 0149751 A1 | * | 7/2001 | C08F 10/02 |
| WO | WO0149751 A1 | * | 7/2001 | C08F 10/02 |

OTHER PUBLICATIONS

Claudio A. Perez, "Genetic Design of Biologically Inspired Receptive Fields for Neural Pattern Recognirion," IEEE Transaction on Systems, Man, and Cybernetics—Part B: Cybernetics, vol. 33, No. 2, pp. 258-270, Apr. 2003.*

Office Action issued in Korean Patent Application No. 2010-7009792, dated Nov. 15, 2011, and English translation thereof (10 pages).*

Ahmad et al., Malaysian Science and Technology Congress, Melaka, 2001 "Neural Networks for Process Monitoring, Control and Fault Detection: Application to Tennessee Eastman Plant" (6 pages).*

Office Action issued in European Patent Application No. 08847638.7-1214, dated Jun. 26, 2012, (6 pages).*

International Search Report for International Application No. PCT/EP2008/064938, mailed on Feb. 2, 2009 (3 pages).

Ahmad et al., Malaysian Science and Technology Congress, Melaka, 2001 "Neural Networks for Process Monitoring, Control and Fault Detection: Application to Tennessee Eastman Plant." (6 pages).

Office Action issued in European Patent Application No. 08847638.7-1214, dated Jun. 26, 2012, (6 pages).

\* cited by examiner

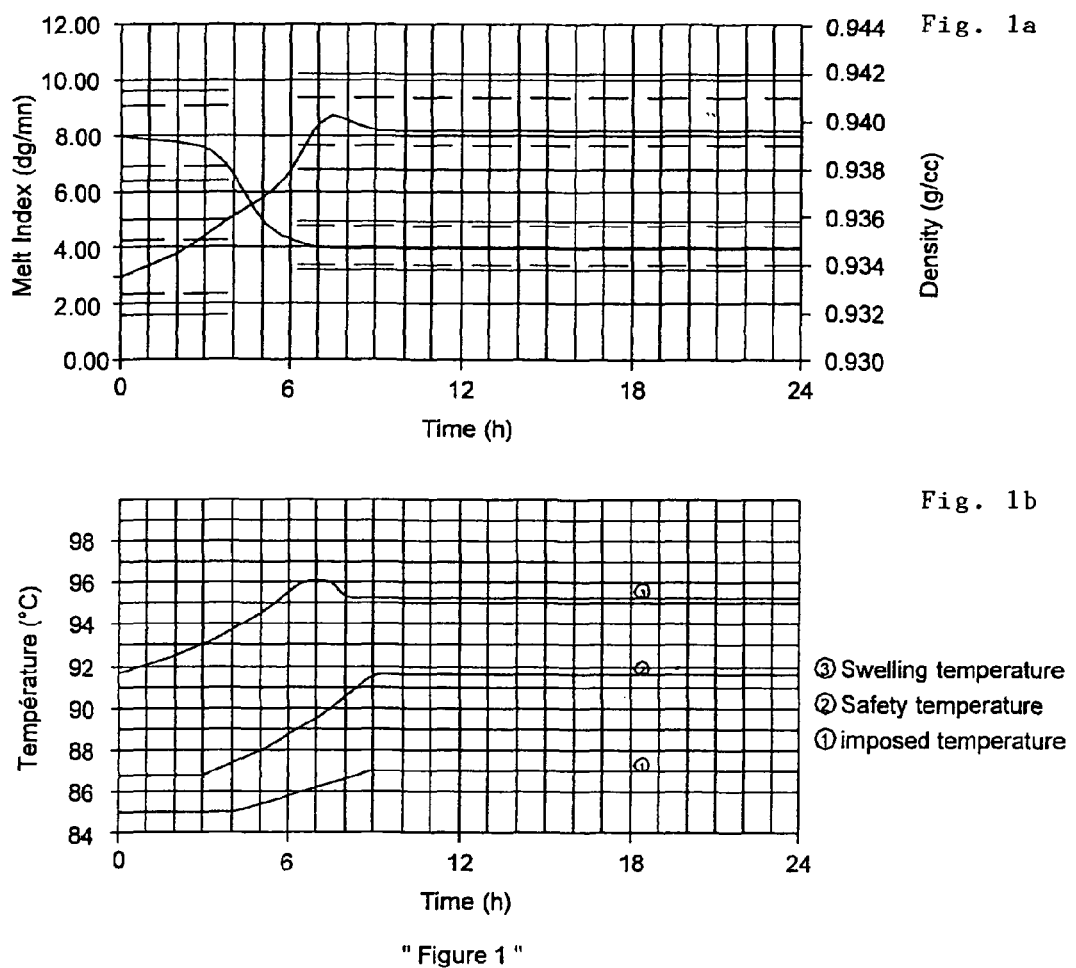
"Figure 1"

METHOD FOR OPTIMISING THE TRANSITION FROM ONE GRADE TO ANOTHER

CROSS-REFERENCE TO RELATED APPLICATIONS

This application claims the benefit of PCT/EP2008/064941, filed Nov. 4, 2008, which claims priority from EP 07120023.2, filed Nov. 5, 2007.

The present invention relates to the polymerisation of olefin monomers in a slurry loop reactor and to a model for determining and optimising the changes in operating conditions that need to be applied when changing from one polymer grade to another.

High density polyethylene (HDPE) was first produced by addition polymerisation carried out in a liquid that was a solvent for the resulting polymer. That method was rapidly replaced by polymerisation under slurry conditions according to Ziegler or Phillips. More specifically slurry polymerisation was carried out continuously in a pipe loop reactor. A polymerisation effluent was formed which was a slurry of particulate polymer solids suspended in a liquid medium, ordinarily the reaction diluent and unreacted monomer (see for Example U.S. Pat. No. 2,285,721). It was necessary to separate the polymer and the liquid medium comprising an inert diluent and unreacted monomers without exposing the liquid medium to contamination so that said liquid medium could be recycled to the polymerisation zone with minimal or no purification. As described in U.S. Pat. No. 3,152,872, a slurry of polymer and the liquid medium were collected in one or more settling legs of the slurry loop reactor from which the slurry was periodically discharged to a flash chamber thus operating in a batch-wise manner.

The double loop systems are quite desirable as they offer the possibility to prepare highly tailored polyolefins by providing different polymerising conditions in each reactor, typically by changing the amount of hydrogen and comonomer from one reactor to the other. In addition, the double loop systems allow for a much longer cumulated residence time of the catalyst in the reaction zones than single reactor systems, thereby improving the catalyst yield. Polymer product is transferred from the first to the second loop through one or several transfer line(s).

In order to insure that the polymer product satisfies the grade requirements, it is necessary to measure the density and melt flow index of the exiting polymers at regular intervals of time during their production. There is however a delay of about 90 minutes between the time the polymer is sampled and the time some of its characteristics are obtained from the laboratory. If the polymer is found to be off specifications, several hours of production need to be declassified. In addition, the operating conditions need to be altered and the amplitude of the correction to be applied and/or the nature of the variables that need to be modified are not obvious. In addition, correcting one grade's characteristics such as density modifies other characteristics such as for example the melt index. Assessing coherent changes in the polymerisation conditions that correct the off-specification characteristics, without modifying those that are correct, is often obtained by a lengthy trial and error process. There is often a further delay, due to the search for correct operating conditions, before the correct specifications are obtained. Similarly when it is desired to change the specifications of the polymer and to move from one grade to another, it is quite tedious to determine the changes in operating conditions that must be applied in order to obtain the desired new grade. In addition, there is a delay of about 90 minutes to verify that the correct specifications have been reached.

Prior art document WO01/49751 discloses a process for producing high density polyethylene or linear low density polyethylene in gas phase reactors, isolated or combined, under polymerisation conditions, in the presence of hydrogen, oxygen, inert diluent(s) and chromium catalyst, provided with on-line control of certain process variables as well as physical properties of the produced resin. The process comprises the use of models for the inference of the physical properties and of the process variables that are not continuously measured as well as models which are relevant for the control of said properties and of the operating conditions of the process. The control of the process variables provides the maximisation of production rate and of catalyst productivity.

Prior art document WO00/22489 discloses a system for on-line inference and control of physical and chemical properties of polypropylene and its copolymers. The system comprises models for the inference of physical and chemical properties that are not continuously measured and relevant models to control these properties as well as production rate, density of the reaction medium and other process variables of interest. The control system allows maximisation of production rate and catalyst yield.

Prior art document WO97/26549 discloses an on-line nuclear magnetic resonance (NMR) system and related methods for predicting one or more polymer properties. A neural network is used to develop a model which correlates process variables in addition to manipulated NMR output to predict polymer properties. In another embodiment, a partial least square regression technique is used to develop a model of enhanced accuracy. Either the neural network technique or the partial least square regression technique may be used in combination with a described multi-model or best-model-selection scheme. The polymer can be selected from polyethylene, polypropylene, polystyrene or ethylene-propylene rubber.

There is thus a need to obtain in real-time an accurate estimate of the modifications that need to be applied manually to the operating conditions in order to change and control the specifications of the exiting polymer.

It is an aim of the present invention to develop a model able to predict how the density and melt index are related to the operating conditions, before starting polymerisation.

It is also an aim of the present invention to use this model to determine the amplitudes of the changes in operating conditions as well as the rates of change necessary to change the polymer characteristics in the shortest time.

It is another aim of the present invention to design a model that is able to deal adequately with strong non-linearities, highly coupled variables and dynamical effects due to product mixing in the reactors.

It is a further aim of the present invention to use the model to optimise the polymer production and to reduce the time necessary to change the specifications of the polymer from one grade to another.

Any one of those aims is, at least partially, fulfilled by the present invention.

Accordingly, the present invention discloses a method for reducing the transition time and the amount of off-specifications polymer produced, during the change of specification from one homo- or co-polymer grade to another, that comprises the steps of:

a) selecting n input variables, linked to the reactor conditions;

b) defining a constrained neural network model of general form $$Res = 1/(1+\exp(-(a_{(n+1)1}*f_1 + a_{(n+1)2}*f_2 + a_{(n+1)3}*f_3 + \ldots + b_{(n+1)})))$$
$$f_1 = 1/(1+\exp(-(a_{11}*X_1 + a_{12}*X_2 + a_{13}*X_3 + \ldots + b_1)))$$
$$f_2 = 1/(1+\exp(-(a_{21}*X_1 + a_{22}*X_2 + a_{23}*X_3 + \ldots + b_2)))$$
$$f_3 = 1/(1+\exp(-(a_{31}*X_1 + a_{32}*X_2 + a_{33}*X_3 + \ldots + b_3)))$$
$$\ldots$$
$$Res = 1/(1+\exp(-(a(n+1)1*f_i + a(n+1)2*f_2 + a(n+1)3*/) + \ldots + b(n+1))))$$

wherein the $X_i$'s are the n normalised input variables, the $a_{ij}$'s and $b_i$'s are numerical coefficients, the $f_i$'s are intermediate functions and Res is the scaled resulting polymer property estimate corresponding to the reaction conditions defined by the n input variables;

c) adjusting the parameters to minimise the error on Res under appropriate constraints, said constraints being imposed, by equalities or inequalities related to any one of Xi's, aij's, bi's, $f_i$'s, Res or combination thereof, or to any of their partial derivatives of any order, and wherein partial derivatives measure the variation of the result derived from an equation when one and only one of the variables is changed by an infinitesimal step;

d) predicting in real time the density and melt flow index of the polymer leaving the reactor from the time evolution of the n input variables in the equations of step b), and including whenever appropriate, dynamic step responses to any varying input conditions;

e) inferring appropriate values for any combination of 2 input variables $X_i$ and $X_j$, such as for example 1-hexene and $H_2$, knowing the other (n−2) varaibles, such as for example the temperature and $C_2$ off-gas, and the desired values of density and melt index;

f) from a given law of time evolution of the n input variables between two steady-state conditions corresponding to two product specifications, calculating the time at which at least one polymer characteristics leaves the product specifications of the first polymer grade and the time at which the latest polymer characteristics reaches the product specifications of the second polymer grade;

g) calculating the time of off-specifications production by computing the difference between the two times calculated in step f);

h) minimising the time of off-specifications production of step g) by modifying the law of evolution of the n input variables, subject to process limitations.

A separate neuronal system is established for density and for melt index and step c) is thus repeated for each of these variables.

In each reactor, the input variables (or operating conditions) are typically selected from polymerisation temperature, pressure in the reactor, monomer, comonomer, hydrogen, catalyst, activating agent or reaction additive, concentrations in the feeds or in the bulk of the reactor, catalyst characterising parameters, production rate, solids concentration, and solids residence time.

In the present invention, all input parameters are thus determined before the change from one grade to another is started and these parameters are then set up manually.

The term partial derivative, as used in this description, refers to the derivative with respect to one variable, all other variables being kept constant.

Typical constraints may result from imposing characteristics of a particular product such as for example the density of a low melt index homopolymer;

from imposing that, at constant melt index, the density of the polymer has a negative first partial derivative with respect to the comonomer concentration but a positive second partial derivative;

from imposing, for the purpose of numerical stability, that the sum of the square of the $a_{ij}$'s and $b_i$'s remains bound by some value;

from imposing that the regression between the observed values and the modelled ones should have a slope of 1 and an intercept of 0.

Typical dynamical response may be determined by observing the temporal evolution of each modelled variable in response to a step modification of a single variable of the model. Typically, most of the variables have first order linear dynamic responses, but the variation of a variable that has a permanent effect, such as for example a catalyst poison, has an integrating response that can be approximated by a second-order linear dynamic response.

Appropriate mixing rules are applied to predict the density and the melt flow of the polymer exiting the reactor. These mixing rules include the situation when product formed in another reactor is admitted into the reactor where the predictive model is used to estimate properties of the product leaving said reactor. Mixing rules are determined by supposing each reactor as perfectly mixed, and by calculating an appropriate average of the situation existing in a reactor at each moment in the past and taking into account the residence time in the reactor. The situation at any time includes polymer product that is synthesised locally and/or polymer being brought into the reactor from an upstream reactor.

The process limitations referred to in step h) of the method is any limitation that is imposed by the configuration and physical or chemical environment of the system. For example, the speed at which the temperature can be modified in the reactor must respect thermal constraints. Also, the presence of 1-hexene in any one reactor cannot be cancelled instantaneously because of the unavoidable arrival of recycled 1-hexene. Similarly, concentrations may not be increased instantaneously. Their rate of evolution will depend on the characteristics of the injection system.

Preferably, the monomer is ethylene and the optional comonomer is 1-hexene.

Preferably, the input variables are polymerisation temperature, ethylene concentration, amount of hydrogen and of 1-hexene in the feed, production rate, solids concentration, and residence time.

LIST OF FIGURES

FIG. 1a represents the evolution of the modelled melt index expressed in dg/min and of the modelled density, expressed in g/cc as a function of time when changing from one grade to another, according to a gradual variation of the polymerisation conditions.

FIG. 1b represents the swelling temperature of the polymer calculated from the model on the top curve, the safety temperature that is at least 5° C. lower than the swelling temperature on the intermediate curve, and the imposed temperature profile on the bottom curve.

EXAMPLES

Polymerisation of ethylene was carried out in a single loop slurry reactor under the following conditions:
temperature=85° C.
ethylene pressure=5.5 bars
$H_2$=72 g/ton $C_2$
$C_6$=70 kg/ton $C_2$ The resulting polyethylene had a density of 0.934 g/cc and a melt index of 8 dg/min.

The new target specifications for the polyethylene were a density of 0.940 g/cc and a melt index of 4 dg/min.

The model allowed the prediction of the optimal new operating conditions necessary to reach the new specifications. They were calculated to be changed as follows.

From time 0, the hexene feed ratio had to be decreased by 6 kg $C_6$/ton $C_2$/h until a feed ratio of 27 kg $C_6$/ton $C_2$ is reached. It had then to be increased at a rate of 4 kg $C_6$/ton $C_2$/h to a feed ratio of 31 kg $C_6$/ton $C_2$.

From time 2h40, the hydrogen feed ratio had to be decreased by 5 g $H_2$/ton $C_2$/h until a value of 60 g $H_2$/ton $C_2$ was reached.

From time 4h, the temperature had to be increased at a rate of 0.4° C./h to a final temperature of 87° C.

The polyethylene had to be declared off-spec when the density model was 0.02 g/cc off target or when the melt index model was 1.6 dg/min off target.

The product left the first specifications 3 hour 38 min after transition start-up and entered the new specifications 6 hour 15 min after transition start-up. It was thus off-spec for 2 hour 37 min.

In addition, the method allows to verify that at all times, the reactor temperature is compatible with the swelling temperature of the polymer. The swelling temperature used herein is fully described in co-pending European application n° EP07119993.9, page 9, line 26 to page 10, line 29 and in claims 1 to 10. It is calculated as a function of comonomer concentration and of polymer number average molecular weight. It further takes into account the solids content and the resin's molecular weight distribution.

This is exemplified in FIG. 1b wherein the top curve represents the swelling temperature of the poymer calculated from the model, the intermediate curve represents the safety temperature that is at least 5° C. lower than the swelling temperature and the bottom curve represents the imposed temperature profile.

The invention claimed is:

1. A method for reducing transition time and amount of off-specifications polymer produced during a change of specification from one homo- or co-polymer grade to another in a double loop slurry reactor with a Ziegler-Natta or a metallocene catalyst system, wherein the polymer is prepared from olefin monomer(s), the method comprising, prior to transition from a first polymer grade to a second polymer grade:

selecting n input variables, linked to reaction conditions;

defining a constrained neural network model of general form:

$f_1 = 1/(1+\exp(-(a_{11}*X_1+a_{12}*X_2+a_{13}*X_3+ \ldots +b_1)))$
$f_2 = 1/(1+\exp(-(a_{21}*X_1+a_{22}*X_2+a_{23}*X_3+ \ldots +b_2)))$
$f_3 = 1/(1+\exp(-(a_{31}*X_1+a_{32}*X_2+a_{33}*X_3+ \ldots +b_3)))$
...
$Res = 1/(1+\exp(-(a_{(n+1)1}*f_1+a_{(n+1)2}*f_2+a_{(n+1)3}*f_3+ \ldots +b_{(n+1)})))$ wherein the $X_i$'s are n normalised input variables, the $a_{ij}$'s and $b_i$'s are numerical coefficients, the $f_i$'s are intermediate functions, and Res is a resulting scaled polymer property estimate corresponding to the reaction conditions defined by the n input variables;

adjusting numerical coefficients of the constrained neural network model to minimise error on Res under constraints, such constraints being imposed by equalities or inequalities on $X_i$'s, $a_{ij}$'s, $b_i$'s, $f_i$'s, Res, any partial derivative $X_i$'s of any order, any partial derivative $a_{ij}$'s of any order, any partial derivative $b_i$'s of any order, any partial derivative $f_i$'s of any order, any partial derivative Res of any order, or combinations thereof, wherein the partial derivatives measure variations of results derived from the constrained neural network model when only one of the input variables is changed by an infinitesimal step;

predicting a density and a melt flow index of polymer leaving the double loop slurry reactor from a time evolution of the n input variables in the constrained neural network model;

inferring values for any combination of two input variables $X_i$ and $X_j$, knowing the other (n−2) variables, and knowing desired values of density and melt flow index;

from a given law of time evolution of the n input variables between two steady-state conditions corresponding to two product specifications, calculating a time at which at least one polymer characteristic leaves product specifications of the first polymer grade and a time at which a latest polymer characteristic reaches product specifications of the second polymer grade, wherein the input variables are determined before transition from the first polymer grade to the second polymer grade;

calculating a time of off-specifications production by computing a difference between the time at which the at least one polymer characteristic leaves product specifications of the first polymer grade and the time at which the latest polymer characteristic reaches product specifications of the second polymer grade; and minimising the time of off-specifications production by modifying the law of time evolution of the n input variables.

2. The method of claim 1, wherein the polymer is a homopolymer comprising ethylene, or wherein the polymer is a copolymer comprising ethylene and 1-hexene.

3. The method of claim 1, wherein the input variables comprise polymerisation temperature, ethylene concentration, amount of hydrogen and of 1-hexene in a feed, production rate, solids concentration, and residence time.

4. The method of claim 3, wherein the input variables further comprise pressure in the double loop slurry reactor, activating agent concentration, reaction additive concentration, and catalyst characterising parameters.

5. The method of claim 1, further comprising, prior to transition from the first polymer grade to the second polymer grade, observing a temporal evolution of each input variable in response to a step modification of a single input variable of the constrained neural network model to determine dynamical response.

6. The method of claim 5, wherein variation of an input variable that has a permanent effect has an integrating response that is approximated by a second-order linear dynamic response.

7. The method of claim 6, wherein the input variable that has the permanent effect is a catalyst poison.

8. The method of claim 1, further comprising supposing that polymer product in each reactor is mixed and calculating an average amount of the polymer product in each reactor in order to use the constrained neural network model to infer estimates of the density and the melt flow index of the polymer product leaving each reactor of the double loop slurry reactor resulting from the operating conditions.

9. The method of claim 8, wherein the polymer product in each reactor includes polymer product that is synthesized within that reactor, or a combination of the polymer product that is synthesized within that reactor and polymer product that is admitted into that reactor from an upstream reactor.

10. The method of claim 1, wherein minimising the time of off-specifications production by modifying the law of time evolution of the n input variables is subject to process limitations.

11. The method of claim 1, wherein the inferred values of the two input variables $X_i$ and $X_j$ are an amount of hydrogen and an amount of 1-hexene.

12. The method of claim 1, wherein the density and the melt flow index are predicted in real time prior to transition from the first polymer grade to the second polymer grade.

13. The method of claim 1, wherein accurate estimates of modifications that need to be applied manually to the operating conditions in order to change and control the specifications of the polymer are obtained in real-time.

14. The method of claim 1, further comprising, prior to transition from the first polymer grade to the second polymer grade, determining amplitudes of changes in the operating conditions and rates of change necessary to change the polymer characteristics using the constrained neural network model.

15. The method of claim 1, further comprising verifying that, at all times, a reactor temperature is compatible with a swelling temperature of the polymer, wherein the swelling temperature is calculated as a function of comonomer concentration and of polymer number average molecular weight.

16. The method of claim 1, wherein optimal new operating conditions necessary to reach the second polymer grade using the constrained neural network model are predicted prior to transition from the first polymer grade to the second polymer grade.

17. The method of claim 1, further comprising manually applying modifications to the operating conditions in order to change and control the specifications of the polymer.

18. The method of claim 1, wherein the input variables are set up manually prior to polymerization.

19. The method of claim 1, further comprising producing the polymer in the double loop slurry reactor with the Ziegler-Natta or the metallocene catalyst system under the reaction conditions linked to the selected n input variables.

* * * * *